C. BRANIFF.
DEMOUNTABLE WHEEL RIM.
APPLICATION FILED OCT. 5, 1915.
1,199,660. Patented Sept. 26, 1916.
2 SHEETS—SHEET 2.
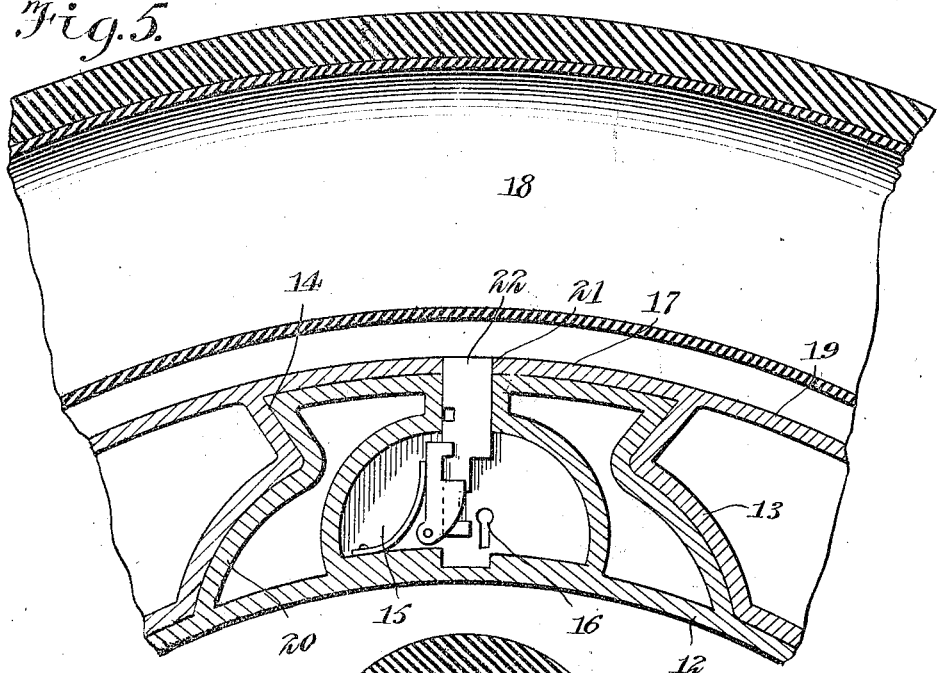
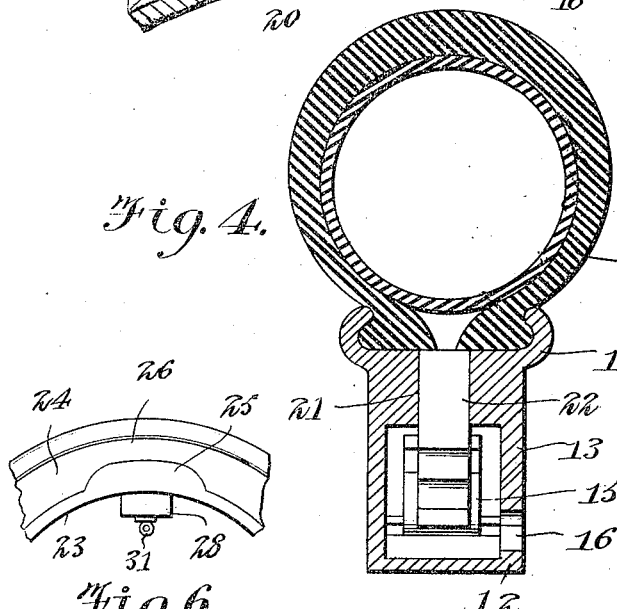
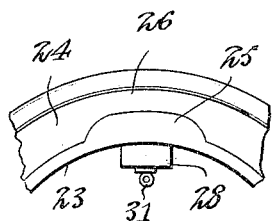
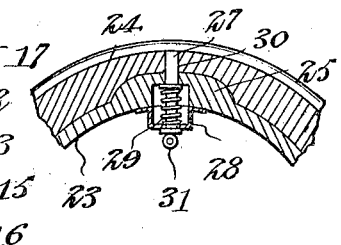
Inventor
Charles Braniff.
Witnesses
By Victor J. Evans
Attorney

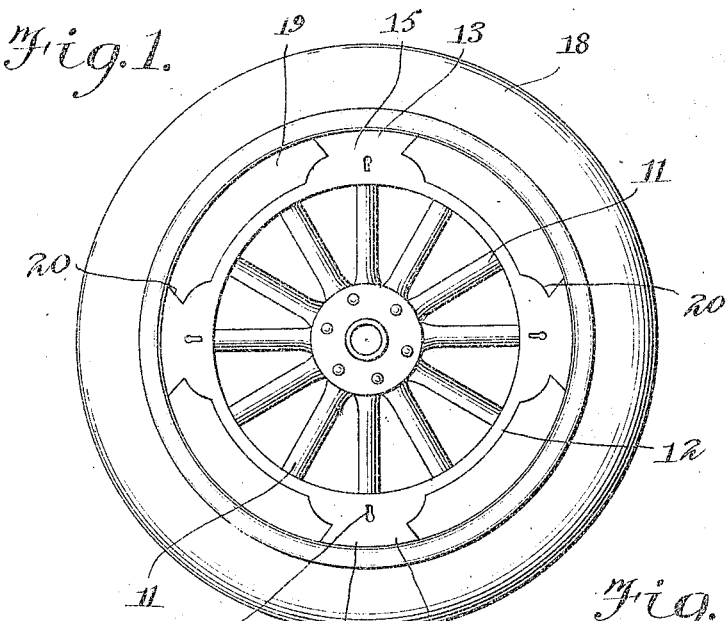
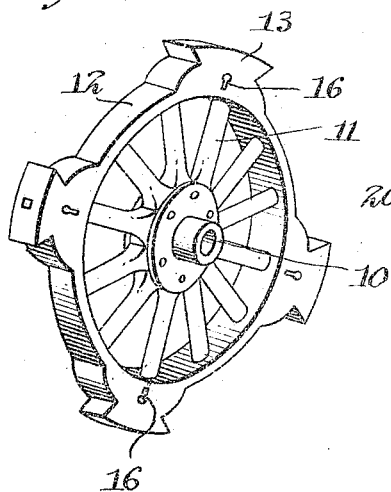
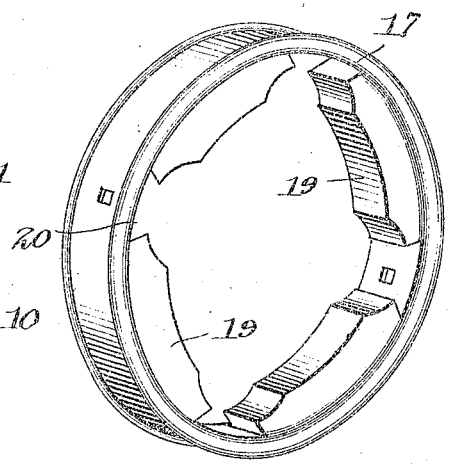

UNITED STATES PATENT OFFICE.

CHARLES BRANIFF, OF CINCINNATI, OHIO.

DEMOUNTABLE WHEEL-RIM.

1,199,660.  Specification of Letters Patent.  Patented Sept. 26, 1916.

Application filed October 5, 1915. Serial No. 54,200.

*To all whom it may concern:*

Be it known that I, CHARLES BRANIFF, a citizen of the United States, residing at Cincinnati, in the county of Hamilton and State of Ohio, have invented new and useful Improvements in Demountable Wheel-Rims, of which the following is a specification.

The invention relates to a vehicle wheel structure, and more particularly to the class of demountable wheel rims for vehicle, automobile or the like wheels.

The primary object of the invention is the provision of a wheel structure of this character wherein the rim carrying the tire is mounted for quick detachment from the body of the wheel in a novel manner without requiring the use of fasteners such as bolts and nuts ordinarily employed for this purpose.

Another object of the invention is the provision of a wheel structure of this character wherein a single lock key may be used for locking or unlocking the rim so that it can be fastened on or removed from the wheel with despatch.

A further object of the invention is the provision of a wheel structure of this character which is simple in construction, reliable and efficient in operation, strong, durable, eliminating the necessity of mechanical skill in the mounting and demounting of the rim, and also which is inexpensive in manufacture.

With these and other objects in view, the invention consists in the construction, combination and arrangement of parts as will be hereinafter fully described, illustrated in the accompanying drawings, and pointed out in the claim hereunto appended.

In the drawings: Figure 1 is a side elevation of a wheel constructed in accordance with the invention; Fig. 2 is a perspective view of the wheel body with the rim removed; Fig. 3 is a perspective view of the rim; Fig. 4 is a vertical transverse sectional view through the wheel; Fig. 5 is a fragmentary longitudinal sectional view through the wheel; Fig. 6 is a fragmentary side elevation of a slight modification of the wheel; and Fig. 7 is a vertical longitudinal sectional view thereof.

Similar reference characters indicate corresponding parts throughout the several views in the drawings.

Referring to the drawings in detail, the wheel structure comprises a hub 10 in which are mounted radial spokes 11, which may be made integral with the hub if desired, and support at their outer ends an annulus or ring 12 formed at diametrically opposite points with outwardly arched swells 13 having dove-tail shaped transversely disposed ribs 14, in each of which is fitted a lock 15, the keyhole 16 therefor opening through one side of the swell 14, and these locks 15 are adapted for detachably fastening a rim 17 upon the body of the wheel.

The rim 17 carries a pneumatic tire 18 of the ordinary well known construction, which is detachably mounted thereon in the usual manner, and at the inner periphery of the said rim are formed webs 19 providing therebetween recesses 20 correspondingly shaped to the swells 13 and ribs 14 upon the annulus or ring 12 for receiving the same so that the rim 17 can be detachably mounted upon the body of the wheel, as shown.

The recesses 20 for the swells 13 and ribs 14 on the annulus or ring 12 open through opposite sides for the convenient removal of the rim from the body of the wheel at either side thereof, and formed in the inner periphery of the rim 17 at the points of the recesses 20 are sockets or mortises 21 for receiving the bolts 22 of the locks 15 to secure the rim 17 upon the body of the wheel and thereby firmly fasten the same together.

Each lock 15 is adapted to be controlled by a suitable key which may either be separable therefrom or permanently attached thereto, and if separable can be conveniently carried in the pocket of the user of the wheel structure.

In Figs. 6 and 7 there is shown a slight modification of the invention, wherein 23 designates a portion of the annulus or ring, 24 the rim which is detachably supported upon the annulus or ring and 25 the swell integrally formed with the annulus or ring 23, it being understood, of course, that a series of these swells is disposed circumferentially of the said annulus or ring, each swell 25 being adapted to fit into a correspondingly shaped notch or recess 26 formed in the rim 24 when the latter is mounted upon the annulus or ring.

Fitted in the annulus or ring 23 and working through each swell 25 in a suitable bore formed therein is a locking bolt 27 which also works through a suitable housing 28 mounted on the inner periphery of the annulus or ring and containing a coiled expansion spring 29, which acts upon the bolt 27 to normally force the same into a keeper notch 30 formed in the rim 24 at the inner periphery thereof, the bolt 27 being formed at its outer end with a knob 31 so that it can be manually gripped and pulled upon for releasing the same to free the rim upon the annulus or ring for the removal of the said rim therefrom.

From the foregoing description, taken in connection with the accompanying drawing, the construction and manner of operation of the device will be clearly understood, and therefore a more detailed explanation has been omitted.

Having thus described my invention, I claim:

In a wheel structure, a wheel body having a felly provided at intervals with outwardly arched swells having dove tail shaped transversely disposed ribs, a key operated lock fitted within each swell and working through the ribs, each lock being formed with a key opening accessible to one side of the swell, and a detachable rim concentrically of the felly and having recesses in its inner periphery in correspondence with the swells and the ribs thereon for receiving the same and engaged by the lock.

In testimony whereof I affix my signature in presence of two witnesses.

CHARLES BRANIFF.

Witnesses:
 E. H. MESCH,
 ELMER MESCH.